April 28, 1953 — R. L. CONNER — 2,636,686
BOLTLESS RAIL JOINT AND SPLICE
Filed May 9, 1950 — 2 SHEETS—SHEET 1
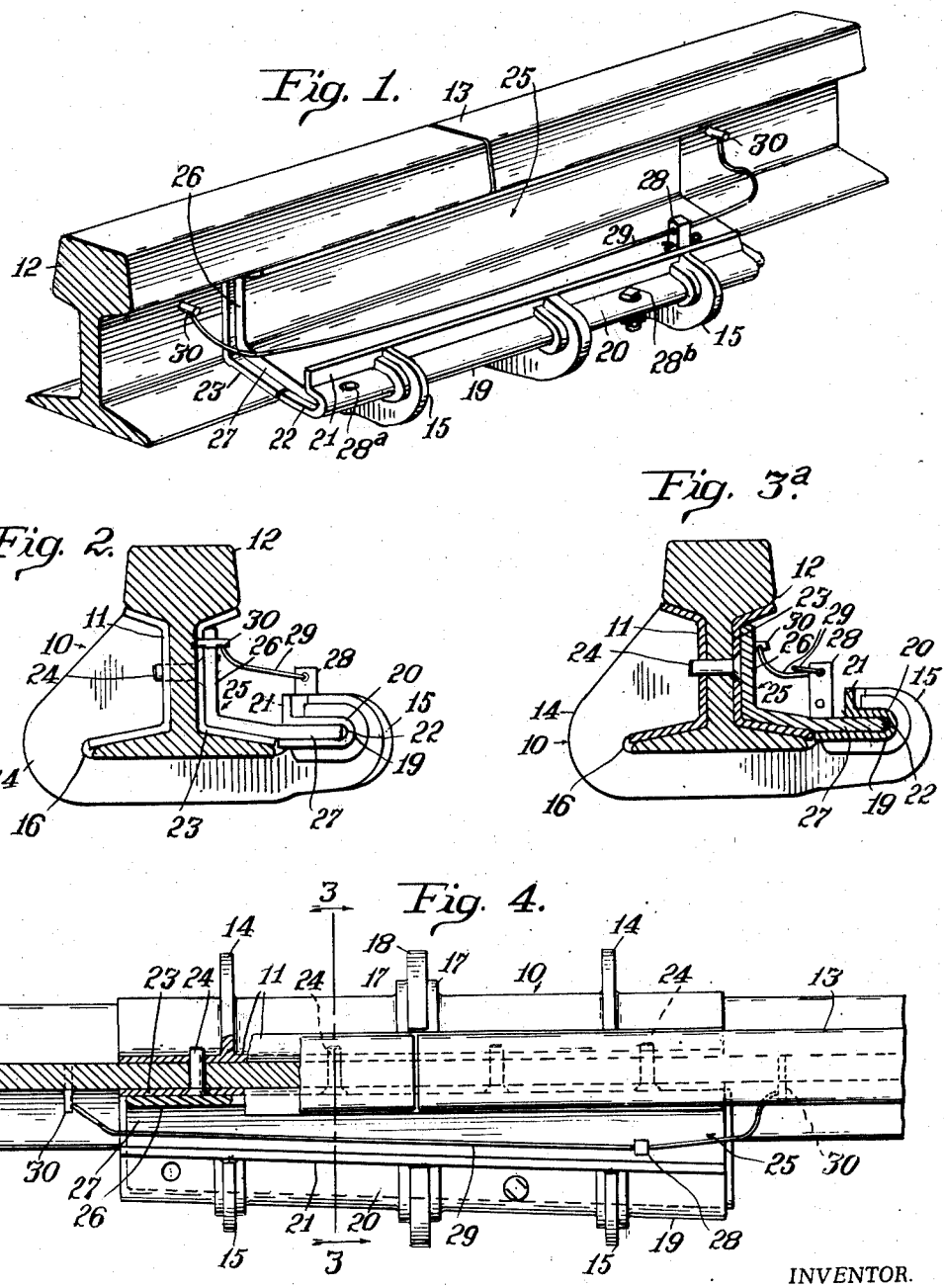
INVENTOR.
Russell L. Conner
BY W. S. McDowell
ATTORNEY April 28, 1953 — R. L. CONNER — 2,636,686
BOLTLESS RAIL JOINT AND SPLICE
Filed May 9, 1950 — 2 SHEETS—SHEET 2
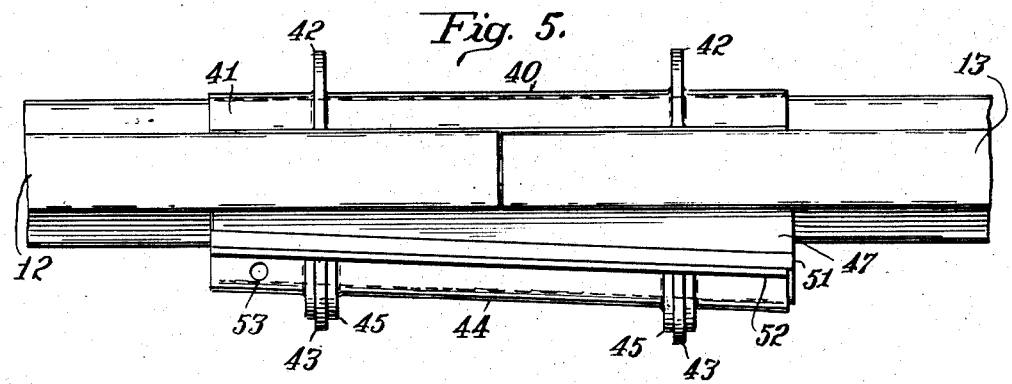
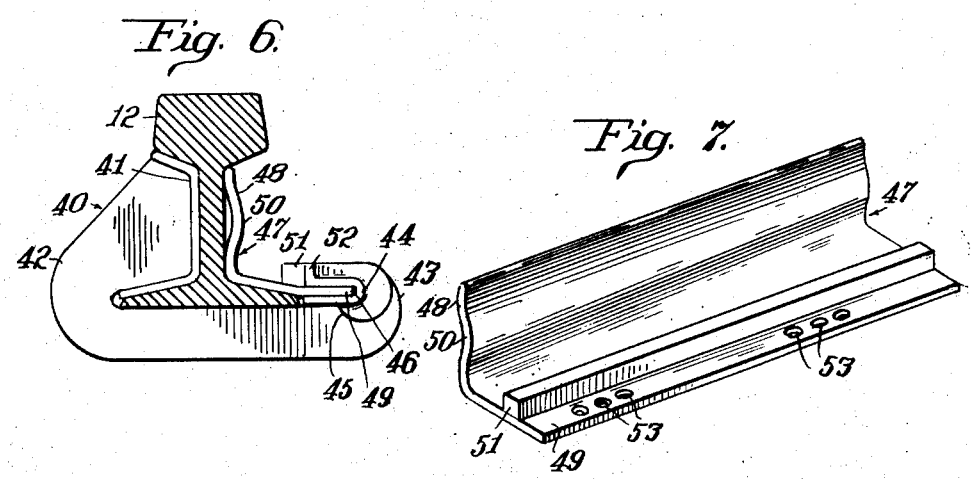
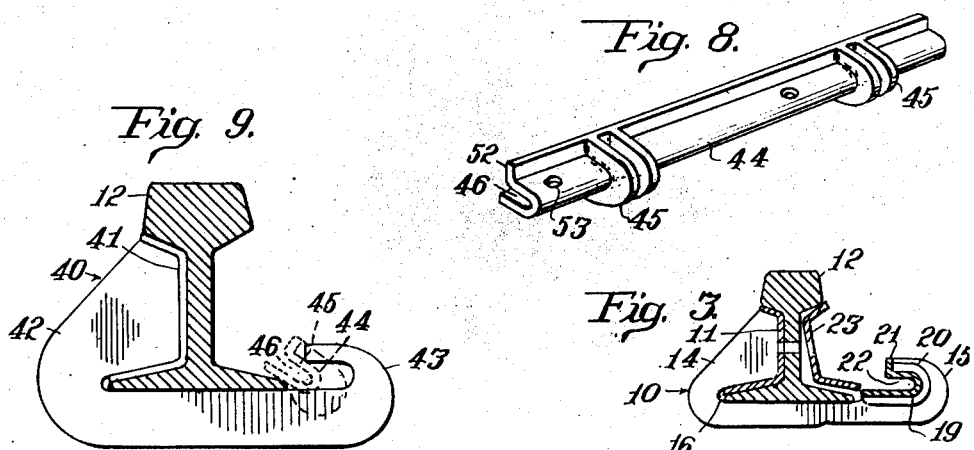
INVENTOR.
Russell L. Conner
BY
W. S. McDonell
ATTORNEY Patented Apr. 28, 1953

2,636,686

UNITED STATES PATENT OFFICE 2,636,686

BOLTLESS RAIL JOINT AND SPLICE

Russell L. Conner, Delaware, Ohio

Application May 9, 1950, Serial No. 160,852

1 Claim. (Cl. 238—207)

The present invention relates generally to rail joints or splices of the type employed in rigidly connecting the adjoining ends of a plurality of rail sections, or in repairing a split or broken rail section by splicing the broken ends thereof together in a manner to provide for continuous usage of such section until the same can be replaced by a permanent new section.

In the past, the usual method of joining the ends of rail sections to one another consisted of applying on either side of the adjoining ends of two sections a pair of fish plates, and thereafter bolting such plates together through the web portion of the adjoining ends of the rail sections. In many cases, the use of the ordinary fish plate was insufficient to secure a satisfactory rigid connection between the adjoining ends of rail sections, and it oftentimes happened that the ordinary fish plates would work loose to permit relative vertical movement between the individual rail sections and consequent jarring and pounding of the wheels of a railway vehicle when passing over the adjoining end portions of the rail sections.

It is, therefore, the primary object of the present invention to provide an improved joint and/or splice to be used in permanently aligning and rigidly joining the mating ends of separate rail sections, or in splicing the broken ends of a broken rail section.

It is a further object of this invention to provide a rail joint or splice which functions to securely and rigidly join the mating ends of rail sections independently of the use of bolts or other fastening devices which are ordinarily employed in conjunction with fish plates to unite the ends of such rail sections.

Still another object of this invention is to provide an improved rail joint and splice which comprises a plurality of cooperative members which may be applied to the rail joint while the same occupies its operative position on the supporting cross-ties and track bed, and wherein the mating ends comprising the joint are rigidly and firmly united by driving a wedge-shaped member into the present assembly to completely eliminate any slack within the joint assembly, and at the same time to tightly draw the separate and opposed members of the joint into engagement with the ball, web and base portions of the rail sections.

Still a further object of the present invention is to provide an improved temporary rail splice which may be employed in splicing and rigidly joining broken ends of an individual rail section without necessitating the removal of the broken section prior to the continued operation of railway vehicles over the track.

For a further and more detailed understanding of the present invention and the various additional objects and advantages realized therefrom, reference is made to the following description and the accompanying drawings wherein:

Fig. 1 is a perspective view of a permanent type rail joint formed in accordance with the present invention, and occupying its operative position with relation to the adjoining ends of a pair of rail sections;

Fig. 2 is an end elevational view of the rail joint disclosed in Fig. 1;

Fig. 3 is a transverse vertical sectional view taken through the present rail joint prior to the driving of the locking wedge;

Fig. 3a is a similar view taken through the rail joint after driving of the wedge element;

Fig. 4 is a top plan view, partially in horizontal section, of the present improved rail joint showing the same applied to the adjoining end portions of a pair of rail sections;

Fig. 5 is a top plan view of a modified temporary splice or joint formed in accordance with the present invention;

Fig. 6 is an end elevational view of the rail splice disclosed in Fig. 5;

Fig. 7 is a persepective view of the locking wedge employed in the present temporary splice construction;

Fig. 8 is a detailed perspective view of the detachable groove or socket device employed with the present rail splice; and Fig. 9 is an end elevational view of the splice, disclosing the attachment of the wedge-receiving socket member.

Referring now to the drawings, and particularly to Figs. 1–4 thereof, it will be seen that my present improved rail joint comprises an elongated metallic body, generally indicated by the numeral 10, which is formed on one side thereof with a longitudinally extending substantially U-shaped plate 11 whose inner surface, as shown particularly in Fig. 2, provides a first angularly related flange which engages the under side of the ball portions of a pair of adjoining rail sections 12 and 13, an intermediate vertically arranged face portion which engages one side of the web of such sections, and a second angularly related flange which engages the upper surface of the base or heel portions of the rail sections. It will be seen that the plate 11 is formed so as to fit snugly the contour of the rail sections along one side thereof below the ball portion of such rail. Rigidly secured to the plate member 11 of the body are a pair of longitudinally spaced transversely extending reenforcing webs 14 which extend transversely from the plate 11 beneath the rail sections 12 and 13 and terminate on the opposite sides of the rail sections in hooked extremities 15. Each of the transverse reenforcing webs 14 is formed to provide a seat region for the base or heel portion of the rail sections, and toward this end, the reenforcing members 14 are provided with recesses 16 to receive one side of the heel portion of the rail sections 12 and 13. The body 10 is provided intermediately of the reenforcing webs 14 with a socketed boss formation 17 for the detachable reception of an additional reenforcing web 18 which is substantially identical to the webs 14 formed integrally with the plate member 11. The detachable web 18, advantageously, may be positioned in transverse alignment with the adjoining edges of the rail sections 12 and 13 to reenforce the joint along the juncture with the two rail sections. It will be understood, however, that the integral reenforcing webs 14 serve to strengthen the rail joint on either side of the adjoining edges of the rail sections 12 and 13, while the detachable reenforcing web 18 functions to strengthen the joint along the plane of the mating edges of the rail sections 12 and 13.

The hooked extremities 15 of the reenforcing webs provide a plurality of U-shaped sockets which detachably receive a longitudinally extending channel member 19. The channel member 19 is provided at spaced intervals with a plurality of channeled boss formations 20 which snugly receive the hooked extremities 15 of the reenforcing webs 14. Additionally, the channel member 19 is provided with an upstanding shoulder or web 21 and a longitudinally extending tapered channel 22.

Positioned adjacent the opposite side of the rail sections 12 and 13 is a second substantially U-shaped rail-engaging plate 23 whose cross-sectional configuration is substantially identical to the plate member 11 formed on the body 10. The plate 23 engages the under side surface of the ball portions of the sections 12 and 13, the inner side surfaces of the web portions of the rail sections, and the upper surface of the heel or base sections of the rail sections. As shown particularly in Fig. 3, the plate members 11 and 23 are arranged so as to fit rather loosely against the web surfaces of the rail sections prior to the application of the locking device, as hereinafter more fully described. The plate members 11 and 23 may advantageously be joined to the side surfaces of the rail sections by means of a plurality of pins 24 which extend through openings formed transversely of the webs of the rail sections 12 and 13. The pins 24 function to prevent longitudinal movement of the plate members 11 and 23 relative to the rail sections, but in no way function to rigidly join the plates 11 and 23 to the webs of the rail sections prior to the application of the locking device which forms a part of the present joint assembly.

To lock the joint in its operative position with respect to the individual rail sections, I employ a longitudinally extending wedge plate 25 which is formed with angularly related webs 26 and 27. The upright web 26 of the wedge device is of a width to fit snugly against the intermediate web of the plate 23, and the outer edge of the laterally extending web 27 of the wedging device is tapered longitudinally corresponding to the taper of the channel member 19. In operation, the wedge device 25 is inserted within the wider end of the channel 22 of the member 19 and in abutting relation to the plate 23. The wedge device is then driven longitudinally of the rail joint, and due to the nature of the tapered outer edge thereof and the tapered channel member 19, the hooked extremities 15 of the transverse reenforcing webs 14 are effectively pushed outwardly and laterally with respect to the rail sections to cause a corresponding inward movement of the plate member 11 into tight-fitting engagement with the opposite side of the rail sections, while at the same time the plate member 23 is pressed inwardly to clamp the web, ball, and heel portions of the rail sections. The channel member 19 and wedge device 25 are provided with a plurality of longitudinally spaced openings which may be brought into register as the wedge device is driven home. These openings serve to receive a headed pin 28 which is inserted upwardly through the lower surface of the channel member 19, and which is formed with transversely disposed openings through which an electrical conductor 29 may be passed to be joined at its respective ends with the individual rail sections, as at 30, and through which a cotter key may be positioned to hold the pin against displacement. It will be understood that the conductor 29 provides electrical connection between the individual rail sections, in order that an electrical circuit may be completed through the individual rail sections to a suitable signal device. Also, the channel member 19, toward its outer side, and the wedge device 25 are provided with additional pin-receiving openings 28a through which additional locking pins may be inserted downwardly, as at 28b, to hold the wedge device and channel member against separation.

Figures 5–9 of the drawings disclose a modified construction comprising a more or less temporary rail joint or splice which may advantageously be employed in effecting a quick and efficient repair of a broken rail section without necessitating relaying such section prior to the passage of traffic over the track. In this modified construction the numeral 40 generally designates the integral body comprising the U-shaped plate member 41 and the transversely extending longitudinally spaced reenforcing webs 42. As in the form of the invention disclosed in Figs. 1–4, the transverse reenforcing webs 42 extend laterally beneath the base or heel of the rail sections and terminate on the opposite side of said sections in hooked extremities 43. The hooked extremities 43 of the reenforcing webs receive the channel member 44 which is provided with the slotted bosses 45 for the reception of the hooked end extremities 43. As shown particularly in Fig. 9 of the drawings, the channel member 44 may be detached from the hooked extremities 43. The temporary splice also embodies a tapered wedge device 47 which comprises the angularly related webs 48 and 49. The upright web 48 is bent longitudinally, as at 50, to provide clearance between the upright web and the heads of any bolts or fastening devices normally extending through the web of the rail section. Further, the bend within the upright web 48 provides increased resiliency within the web as the wedge device 47 is driven home. Additionally, the horizontal or transverse web 49 of the wedge device is provided with a longitudinally extending shoulder or abutment 51 which is adapted to engage the upright web formation 52 formed along the inner edge of the channel member 44. The shoulder formation 51 is disposed in acutely angular relation to the longitudinal axis of the wedge device 47, as is the upstanding web formation 52 on the channel member 44. Thus, as the wedge device 47 is driven longitudinally of the splice, with the outer lateral edge of the web 49 occupying the channel 46, contact between the shoulder 51 and the web 52 forces the hooked end extremities of the transverse webs 42 outwardly to draw the opposite U-shaped plate 41 into tight-fitting engagement with the outer side of the rail sections. At the same time, the vertical web 48 of the wedge device is crowded inwardly against the web portion of the rail section to effectively clamp the web portions of the rail between the plate 41 and the upright web 48. Both the channel member 44 and wedge device 47 are provided with pin-receiving openings 53 which are brought into registration with one another as the wedge device 47 is finally driven home. Thereafter, the openings 53 receive a locking pin device which functions to hold a wedge device 47 against accidental withdrawal from within the channel 46 of the member 44.

In operation, the present improved rail joint and splice may be applied to the adjoining ends of rail sections, or to the broken region of a single rail section, without necessitating the removal of such sections from their supporting ties. Either of the bodies 10 or 40 may be initially applied to the outer surface of the rail sections by positioning the transverse reenforcing webs 14 between the section-suporting ties and beneath the heels of the rail sections which extend between adjacent ties. Thereafter, the channel members 19 and 44 may be attached to the hooked extremities of the transverse webs by inserting the same in a twisting movement, as indicated in Fig. 9 of the drawings, to provide a horizontally disposed open channel adjacent the inner heel portions of the adjoining rails. Thereafter, the separate wedge devices 25 and 47 may be driven longitudinally within the channel provided by the channel member 19 and 44 to take up the slack between the outer plate members 11 and 41 and the web portion of the rail section, while at the same time forcing the upright webs 26 and 48 into tight-fitting engagement with the inner surface of the web portions of the rail sections. Once the pin-receiving openings are brought into registration, the locking pins may be inserted therethrough to firmly lock the wedge devices in their operative positions, and in the case of the permanent joint construction as disclosed in Figs. 1–4, the electrical conductor 29 may thereafter be trained through the opening in the pin 28 and joined in its respective ends in electrical connection with the separate rail sections.

In view of the foregoing, it will be seen that the present invention provides a constructionally simple yet mechanically efficient rail joint or splice which effectively and rigidly joins the abutting end portions of a pair of rail sections, or the broken end regions of the single rail section, in a manner to prevent separation of such sections in lateral and vertical directions. Joints and splices formed in accordance with the present invention are further characterized by their ability to be readily and easily installed in operative relation to track-forming rail sections without necessitating the removal of such sections from their supporting ties. Through the use of a bridging electrical conductor in association with the locking pins of the present joints and splices, a signal circuit may be arranged to be either opened or closed in the event that the electrical conductor is disturbed, as by an attempt to disassemble the joint or splice. Thus, the indication of a dangerous condition may be readily brought to the attention of the proper persons, in the event that the joint or splice is in any way disturbed from its proper position. Further, the present rail splice may be applied to rail joints or broken rail ends without necessitating the use of special tools other than the ordinary spike mall or a heavy hammer. Where a break or joint occurs between cross ties, the detachable web 18 may be employed to strengthen the splice in the region of the break; and where the break occurs over a cross tie, the web 18 is removed and the channel members positioned inside of any rail spikes with the reenforcing webs 14 extending on either side of a cross tie.

I claim:

In a device for splicing adjoining ends of longitudinally aligned rail sections; an elongated body having a vertically arranged face portion for engagement with one side of the intermediate web portions of a pair of longitudinally aligned adjoining rail sections and arranged to span the adjoining ends of the rail sections, a first outwardly turned flange for engagement with the under surface of the ball portions of the pair of rail sections on one side thereof, and a second outwardly turned flange for engagement with one side of the base portions of the pair of rail sections, said body being formed with a plurality of longitudinally spaced laterally extended cross webs arranged to extend under and across the base portions of the said sections on either side of the adjoining ends of the rail sections and terminating in upwardly and inwardly turned hooked extremities adjacent the opposite side of the base portions of the rail sections; an elongated channel-forming member engageable with the hooked extremities of said body on the said opposite side of the rail sections and providing a longitudinally extending channel opening inwardly toward the rail sections; an elongated angle plate having angularly related webs arranged to engage the under surface of the ball portions, web portions, and base portions of the rail sections on the sides thereof opposite the face portion of said body; and a longitudinally tapered wedge having a first upstanding web for abutment with the web of said angle plate which engages the web portions of said rail sections and a second angularly related web for insertion within the channel of said channel-forming member, said wedge, when driven longitudinally between said channel member and the web of said angle plate engaging the web portions of the rail sections, serving to draw the face portion of said body and said angle plate into tight-fitting clamping engagement with the rail sections on either side of the adjoining ends of said sections.

RUSSELL L. CONNER.

References Cited in the file of this patent
UNITED STATES PATENTS

| Number | Name | Date |
|---|---|---|
| 999,552 | Detzel | Aug. 1, 1911 |
| 1,134,824 | Decker et al. | Apr. 6, 1915 |
| 1,215,373 | Hill | Feb. 13, 1917 |
| 1,549,054 | Bacher | Aug. 11, 1925 |